UNITED STATES PATENT OFFICE.

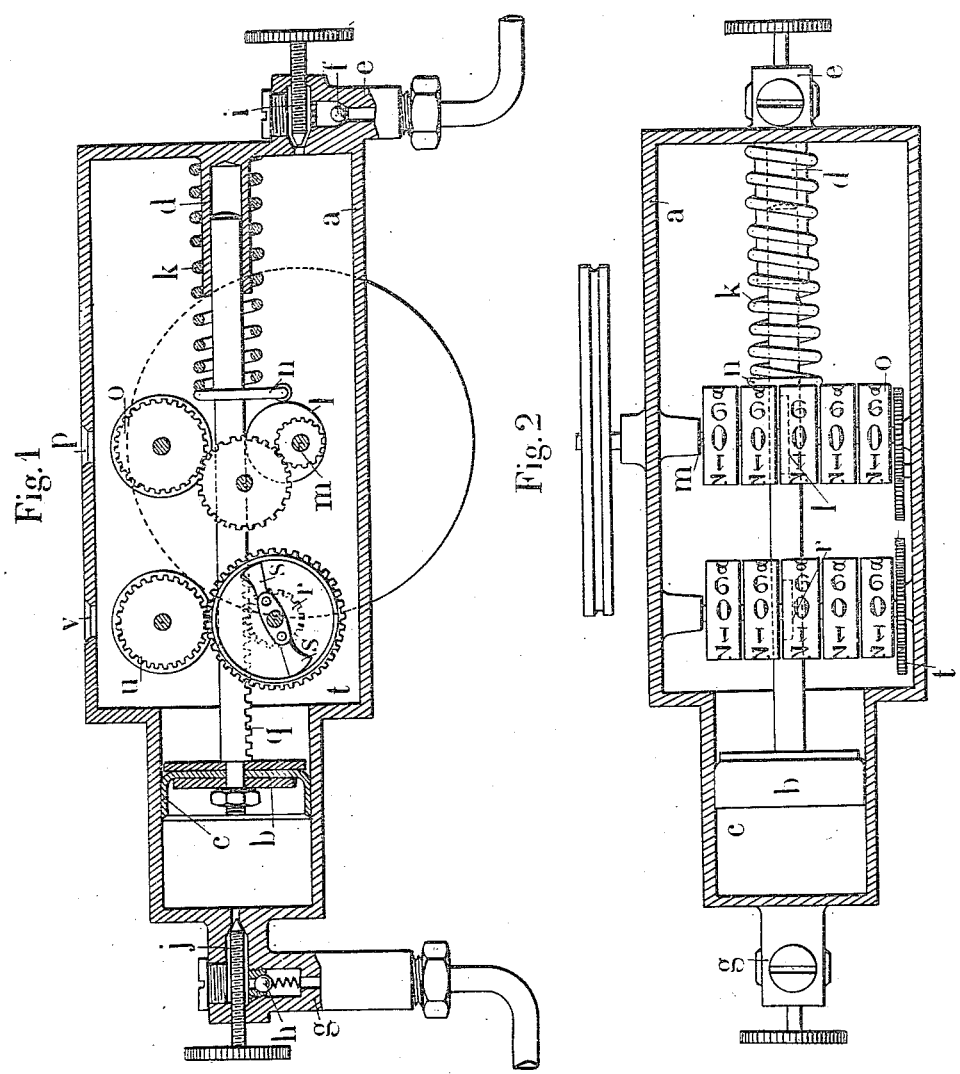

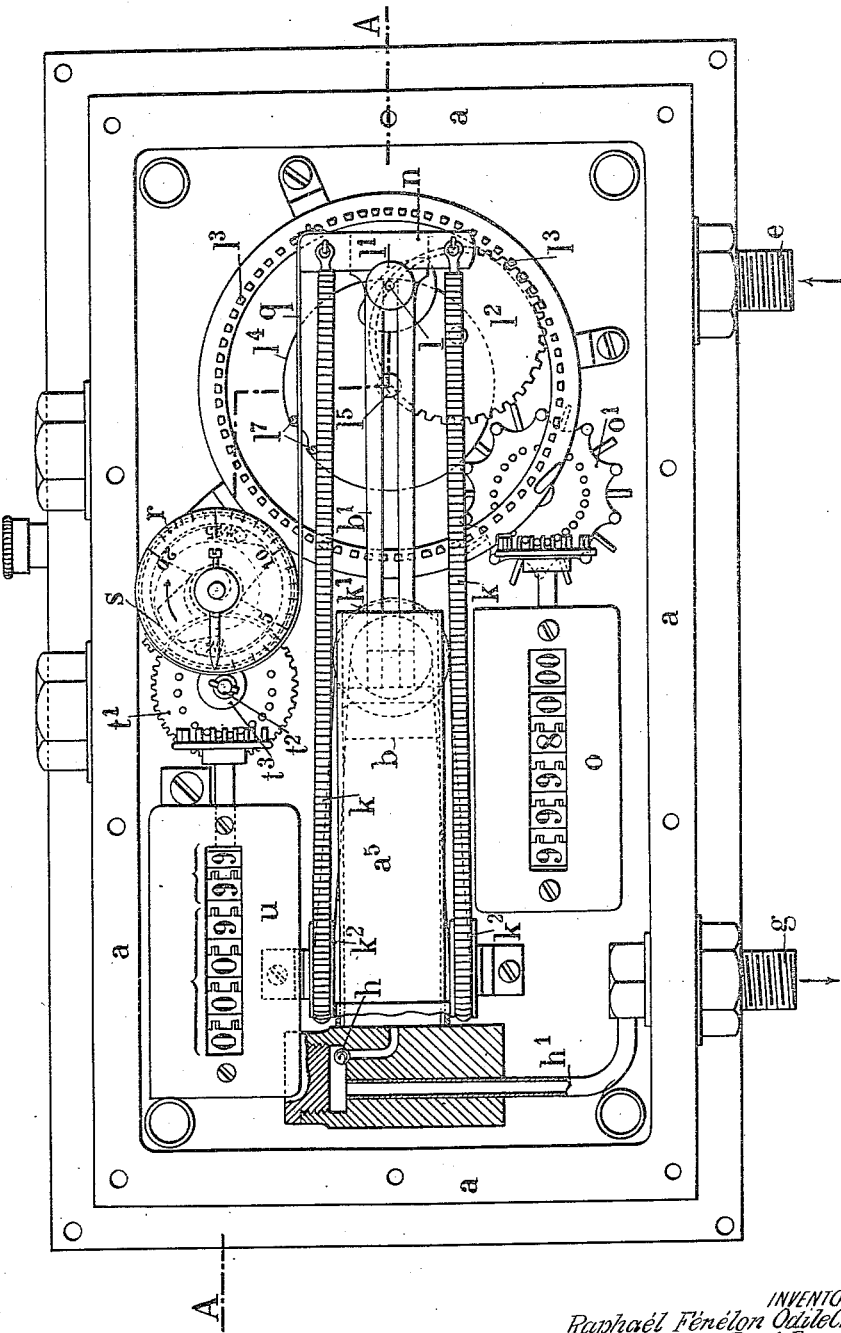

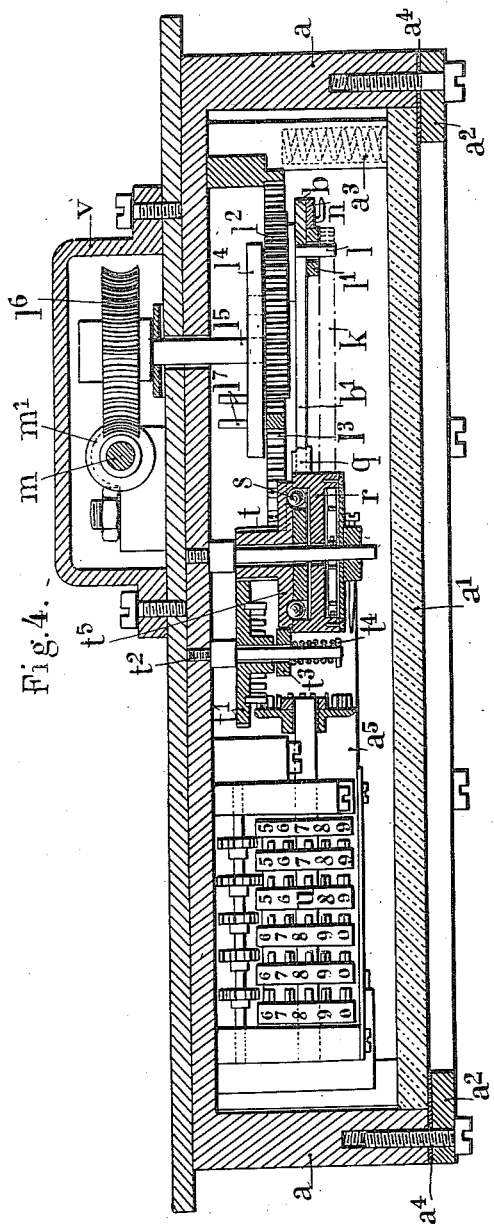

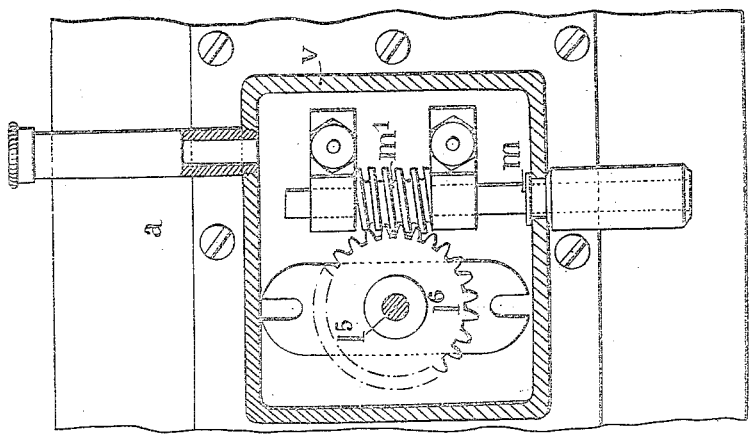

RAPHAËL FÉNÉLON ODILE CHAUVIN AND RENÉ ARNOUX, OF PARIS, FRANCE.

APPARATUS FOR REGISTERING THE CONSUMPTION OF LIQUID FUEL.

1,043,669.  Specification of Letters Patent.  Patented Nov. 5, 1912.

Application filed December 17, 1907. Serial No. 406,867.

*To all whom it may concern:*

Be it known that we, RAPHAËL FÉNÉLON ODILE CHAUVIN and RENÉ ARNOUX, both citizens of the Republic of France and both of 186 Rue Championnet, in the city of Paris, Republic of France, engineers, have invented an Improved Apparatus for Registering the Consumption of Liquid Fuel, of which the following is a full, clear, and exact description.

Our invention is an improvement in apparatus for registering the consumption of liquid fuel, and consists in certain novel constructions and combination of parts hereinafter described and claimed.

The object of the invention is to provide a controlling apparatus for registering the quantity of liquid fluid consumed by thermal motors, as for example the quantity of petrol consumed by an explosion engine, and under conditions which will render fraud impossible.

The apparatus consists essentially of a single acting pump, in which the piston is normally moved toward the delivery end of the pump cylinder, by a counter balance, and is returned positively through mechanism connected with the motor shaft.

The admission port of the pump which is provided with a check valve, is in communication with the liquid fuel reservoir, and the delivery or exhaust port which is also provided with a check valve is connected with the motor in which the liquid is used, as for instance the carbureter.

In addition a counter is provided which registers the linear displacement of the piston rod at each stroke the said displacement being proportional to the quantity of liquid fuel received by the motor.

Referring to the drawings forming a part hereof, Figure 1 is a longitudinal section of the improvement. Fig. 2 is a plan view. Fig. 3 is an elevation of a modified form of apparatus. Fig. 4 is a section on the line A—A of Fig. 3, and Fig. 5 is a rear view.

The embodiment of the invention shown in Figs. 1 and 2, comprises a fluid tight box or casing $a$, in which the mechanism is inclosed, the casing being provided at one end with a reduced portion $a^x$ forming a pump body, in which a piston $b$ moves, the piston being provided with a leather cup $c$, so arranged as to permit the passage of the fluid when the piston is on its return stroke, that is the cup faces toward the delivery end of the cylinder.

The outer end of the piston rod is received in a bushing $d$, integral with the opposite end of the casing, and a spring $k$, encircles the bushing and the piston rod, being arranged between the end wall of the casing and a collar or arm $n$ on the piston.

One edge of the rod is provided with rack teeth $q$, which mesh with a pinion $r$, connected by a silent feed clutch $s$, with a crown wheel $t$, which crown wheel meshes with a counting device $u$, for registering the linear displacement of the piston rod in the delivery direction, and a window $v$ is provided in the casing, for permitting observation of the counter.

The spring $k$ is the counter balance acting normally to force the piston toward the delivery end of the pump, and the piston is moved in a reverse direction, by a cam received on the shaft $m$, connected with the motor shaft, which cam bears against the friction roller on the collar or arm $n$. The shaft $m$ is provided with a pinion $m'$ meshing with an idler $m^2$, which meshes with a pinion $o'$ connected with a revolution counter, the indications of which are read through a window $t$ in the casing provided with a transparent covering.

A pipe $e$ leads from the reservoir, and delivers to the casing, the said pipe being provided with a check valve $f$, and with a needle valve $i$, and the pump chamber delivers to the motor through a pipe $g$, also provided with a check valve $h$, and a needle valve $j$.

The mechanism shown in Figs. 3 to 5 inclusive comprises a casing closed at its front by a glass $a'$, secured in place by a frame $a^2$, connected to the box by screws, and springs $a^3$ are located in sleeves within the casing, and bear against the glass, to insure a water tight joint. A gasket $a^4$ is arranged between the frame and the casing against which the glass bears, and an admission pipe $e$ leads to the casing from the reservoir.

Within the box is arranged a pump cylinder $a^5$, opening directly into the casing at one of its ends, and communicating at its opposite end with a passage $h^2$ communicating with the outlet pipe $g$, and a check valve $h'$ is arranged in the passage.

The piston $b$, is constructed in the same manner as the piston $a$ before described, and is normally moved toward the delivery end of the cylinder by coil springs $k$, which springs have their ends connected with a cross head $n'$, on the outer end of the piston rod, $b'$, the central portions of the springs passing over pulleys $k^3$ at the delivery end of the pump.

The piston is moved in the opposite direction by a friction roller $l^2$ acting against the head $n'$, the friction roller being fixed to a planetary pinion $l^3$, meshing with an internal gear $l^4$, whose diameter is twice that of the pinion. The planetary pinion $l^3$ is journaled on a disk $l^5$ keyed to a shaft $l^6$, which shaft is provided with a worm wheel $l^7$, meshing with a worm $m^2$, on a shaft $m'$, which is driven from the motor. The disk $l^5$ carries two pins $l^8$ which are adapted to engage and operate a star wheel $o'$, operating a revolution counter $o$.

It will be evident from the description, that as the disk $l^5$ rotates, the planetary pinion $l^3$ will be revolved in a circle whose axis is the shaft $l^6$. The internal gear which is fixed, will rotate said pinion in a reverse direction, thus moving the friction roller $l^2$, horizontally and in a straight line.

The head $n'$ connected with the piston rod $b'$ is connected with a barrel $r$, by means of a steel band $q$ winding upon the barrel. The barrel drives a pinion $t$ in the direction of the arrow shown, being connected therewith by a silent feed clutch $s$, and the pinion $t$ transmits the motion it receives to the peg wheel $t'$, which connects with and drives the counter $u$, the counter registering the linear displacement of the piston $d$.

To prevent retrograde movement of the counter while the clutch $s$ is out of gear, the axle $t^2$ of the peg wheel carries a loosely mounted eccentric $t^3$, normally moved in a reverse direction by a spring $t^4$, and the eccentric locks the plate $t^5$ during the reverse movement of the feed clutch. To prevent cutting of the shafts $l^5$, and the gears $l^6$ and $m'$, they rotate in a box $v$, containing oil.

The operation of the device is as follows: Normally the body of the pump is filled with fuel, and the piston at each revolution of the shaft $m$, is operated on the return stroke the delivery stroke being made by the spring or counter balance. Its travel in the delivery direction is variable, and depends upon the volume of the liquid fuel which the constant level reservoir of the carbureter can admit. The counter $u$ registers the linear displacement of the piston in the delivery direction, thus engaging the flow of liquid fuel which enters the carbureter. Fraud is rendered impossible by the improvement, since the pump can only operate when it is intercalated between the reservoir and the carbureter and is actuated by the motor. Moreover, the indications furnished by the counters $o$ and $u$, may be compared to ascertain whether the quantity of fuel consumed corresponds to the number of revolutions made by the motor.

The improvement also forms a feed pump for the liquid fuel permitting the reservoir containing the latter to be placed in any desired position relative to the apparatus.

We claim:

1. An apparatus adapted to register the quantity of liquid fuel used in explosion motors, comprising in combination with the motor and the reservoir, a pump, the admission port of which is connected to the fuel reservoir and the delivery port is connected to the carbureter of the motor, a positive mechanical connection between the motor and the pump piston for bringing back this piston to its starting point whatever may be the amplitude of its delivery stroke, a returning spring urging the pump piston in the direction of the delivery and imparting to said piston its forward movement until the latter is arrested by the resistance opposed by the liquid driven back, and a means for registering the linear displacements of the piston at each distribution stroke.

2. An apparatus adapted to register the quantity of liquid fuel used in explosion motors, comprising in combination with the motor and the reservoir, a pump, the admission port of which is connected to the fuel reservoir and the delivery port is connected to the carbureter of the motor, a positive mechanical connection between the motor and the pump piston for bringing back this piston at its starting point whatever may be the amplitude of its delivery stroke, a returning spring urging the pump piston in the direction of the delivery and imparting to said piston its forward movement until the latter is arrested by the resistance opposed by the liquid driven back, a means for registering the linear displacements of the piston at each distribution stroke, and a means for registering the number of revolutions of the driving shaft.

3. An apparatus adapted to register the quantity of liquid fuel used in explosion motors, comprising in combination with the motor and the reservoir, a pump, the admission port of which is connected to the fuel reservoir and the delivery port is connected to a carbureter, a piston animated with a rectilinear reciprocating motion, a piston rod constituting a slide, a planetary pinion carrying a crank pin engaged in said slide, a fixed internally toothed crown having a diameter twice greater than that of this pinion and with which gears the said pinion, a disk concentric to this crown and carrying the axis of the planetary pinion, a mechanical connection connecting the motor shaft to said disk, returning springs adapted to urge the piston in the direction of the delivery and imparting to this piston its forward movement until it is arrested by the resistance opposed by the liquid driven back, means for registering the linear displacements of the piston, and means for registering the number of revolutions of the driving shaft.

The foregoing specification of our improved apparatus for registering the consumption of liquid fuel, signed by us this third day of December, 1907.

RAPHAËL FÉNÉLON ODILE CHAUVIN.
RENÉ ARNOUX.

Witnesses:
DEAN B. MASON,
MAURICE H. PIGNET.